(12) United States Patent
Peeples et al.

(10) Patent No.: US 6,471,065 B1
(45) Date of Patent: Oct. 29, 2002

(54) MULTISTACK PIZZA BAG

(75) Inventors: Kathleen Gay Peeples, Houston, TX (US); Joseph F. Fiore, Lebanon, PA (US)

(73) Assignee: Igloo Products Corp., Houston, TX (US)

( * ) Notice: Subject to any disclaimer, the term of this patent is extended or adjusted under 35 U.S.C. 154(b) by 30 days.

(21) Appl. No.: 09/708,320

(22) Filed: Nov. 8, 2000

(51) Int. Cl.[7] .............................................. A45C 11/20
(52) U.S. Cl. ........................................ 206/545; 220/9.4
(58) Field of Search ................................ 206/545, 549; 220/9.4; 383/119, 17

(56) References Cited

U.S. PATENT DOCUMENTS

| | | | | |
|---|---|---|---|---|
| 4,376,558 A | * | 3/1983 | Bandar | 312/259 |
| 4,537,313 A | * | 8/1985 | Workman | 206/545 |
| 4,578,814 A | * | 3/1986 | Skamser | 389/99 |
| D296,289 S | * | 6/1988 | Glynn | D7/607 |
| 4,802,233 A | * | 1/1989 | Skamser | 383/15 |
| 4,806,736 A | * | 2/1989 | Schirico | 219/386 |
| 4,903,859 A | * | 2/1990 | Derby et al. | 383/41 |
| 5,158,369 A | * | 10/1992 | Derby | 383/67 |
| 5,454,471 A | * | 10/1995 | Norvell | 206/545 |
| 5,501,338 A | * | 3/1996 | Preston | 206/545 |
| 5,762,260 A | * | 6/1998 | Goglio | 229/199 |
| 5,906,290 A | * | 5/1999 | Haberkorn | 220/505 |

* cited by examiner

Primary Examiner—Mickey Yu
Assistant Examiner—Troy Arnold
(74) Attorney, Agent, or Firm—Duane Morris LLP

(57) ABSTRACT

The present invention is directed toward insulated multistack pizza carriers. The pizza carriers of the present invention comprise a top wall, a bottom wall, a back wall, a front wall and side walls.

20 Claims, 2 Drawing Sheets

MULTISTACK PIZZA BAG

BACKGROUND OF THE INVENTION

1. Field of the Invention

The present invention is directed toward insulated multistack pizza carriers. The pizza carriers of the present invention comprise a top wall, a bottom wall, a back wall, a front wall and side walls.

2. Description of the Prior Art

Insulated bags have been used to carry pizzas. Such bags lack the internal volume and the structural integrity needed to carry more than a relatively small number of pizzas.

Prior art pizza bags have limited insulating capacity which limits the duration that pizza can be carried in such prior art bags without cooling to near ambient temperature conditions. In the pizza delivery art, it is desirable to deliver pizzas that are at a temperature in excess of 145 degrees Farenheit. Such temperatures are commonly referred to as "hot".

SUMMARY OF THE INVENTION

The present invention is directed toward a thermally insulated multistack pizza bag comprising an insulated back wall comprising a top outer edge, a bottom outer edge, a first side outer edge, and a second side outer edge. The pizza bag further comprises an insulated top wall comprising a back edge attached to the top outer edge of the back wall such that the top wall is substantially perpendicular to the back wall and further comprising a front edge opposite the back edge.

The invention further comprises a handle. In one embodiment, the handle is attached to the top wall and an adhesive strip is mounted on the top wall within 18 inches of the front edge. In another embodiment, the handle is attached to the bottom of the pizza bag.

The pizza bag also further comprises an insulated bottom wall comprising a back edge attached to the bottom outer edge of the back wall such that the bottom wall is substantially perpendicular to the back wall and further comprising a front edge opposite the bottom wall back edge. The bottom wall further comprises a horizontally extending rib channel.

The invention further comprises a first insulated side wall attached to the back wall, bottom wall and top wall such that the first side wall, is substantially perpendicular to the back wall, the bottom wall, and the top wall, when the first side wall is in an unfolded position. The first side wall comprises an upper section comprising a vertically extending rib channel a lower section comprising a vertically extending rib channel and a horizontally extending joint at the intersection of the upper and lower sections.

The invention also comprises a second insulated side wall attached to the back wall, bottom wall, and top wall, such that the second side wall is substantially perpendicular to the back wall, the bottom wall, and the top wall, when the second side wall is in an unfolded position. The second side wall comprises an upper section comprising a vertically extending rib channel, a lower section comprising a vertically extending rib channel, and a horizontally extending joint at the intersection of the upper section and lower section. The second side wall is attached to the top wall and bottom walls opposite from the first side wall. The second side wall further comprises a front section.

The invention further comprises a rib placed in each rib channel.

The invention further comprises an insulated front wall comprising a bottom border, a top border, and two side borders. The bottom border is pivotably attached to the front edge of the bottom wall.

The invention further comprises a closure flap attached to the top border of the front wall, and sized sufficiently large to extend over the adhesive strip. The invention also comprises an adhesive affixed to the closure flap such that when the closure flap is placed on the adhesive strip, the adhesive material adheres to the adhesive strip.

DESCRIPTION OF THE PREFERRED EMBODIMENTS

Figure 1:
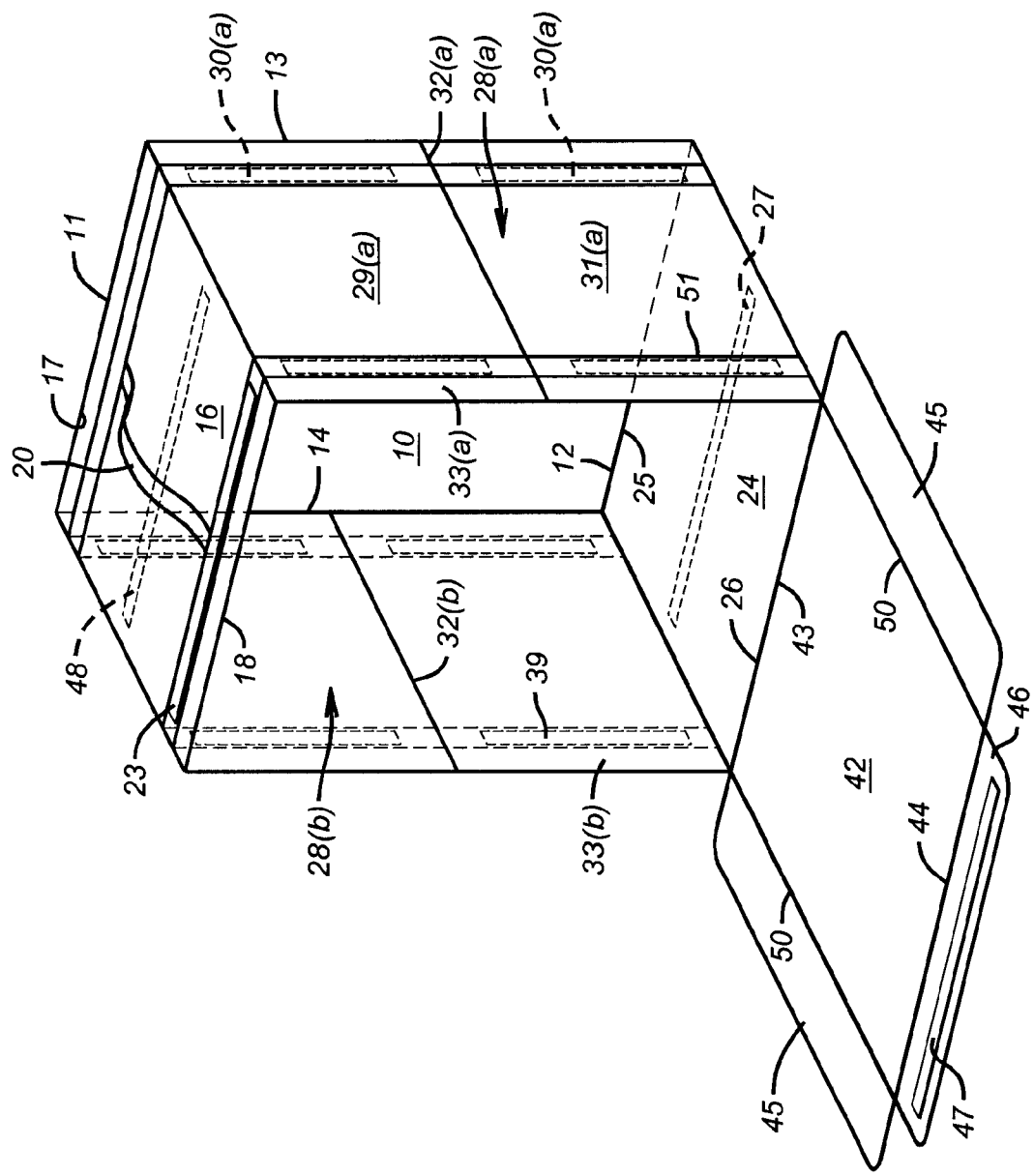
FIG. 1 is an isometric view of the present invention in an unfolded position.

The present invention is directed toward a thermally insulated multistack pizza bag comprising an insulated back wall 10 comprising a top outer edge 11, a bottom outer edge 12, a first side outer edge 13, and a second side outer edge 14 as shown in FIG. 1. The pizza bag further comprises an insulated top wall 16 comprising a back edge 17 attached to the top outer edge of the back wall such that the top wall is substantially perpendicular to the back wall and further comprising a front edge 18 opposite the back edge as shown in FIG. 1.

Figure 4:
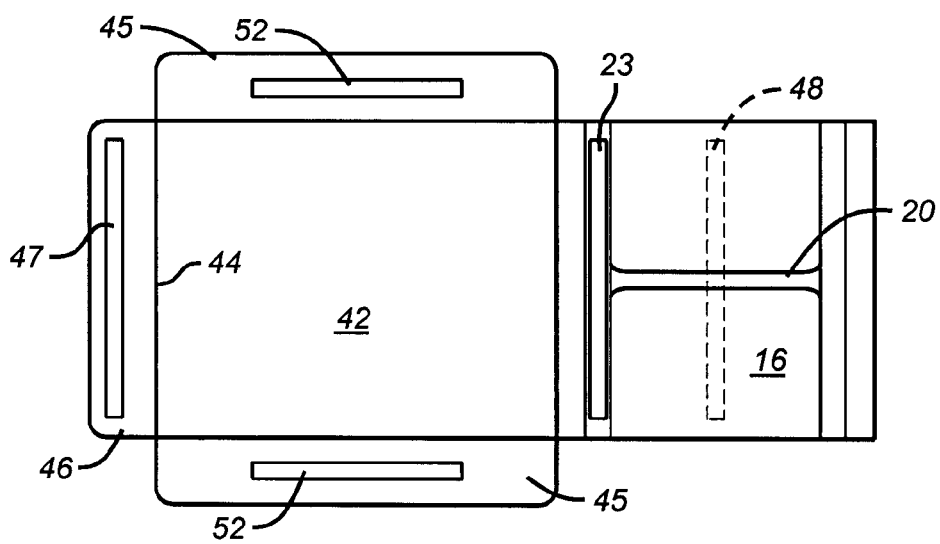
FIG. 4 is a top view of an embodiment of the front wall.

In a preferred embodiment the top wall comprises a horizontally extending rib channel 48 as shown in FIGS. 1 and 4. In another preferred embodiment, the top wall and the bottom wall are rectangular.

Figure 3:
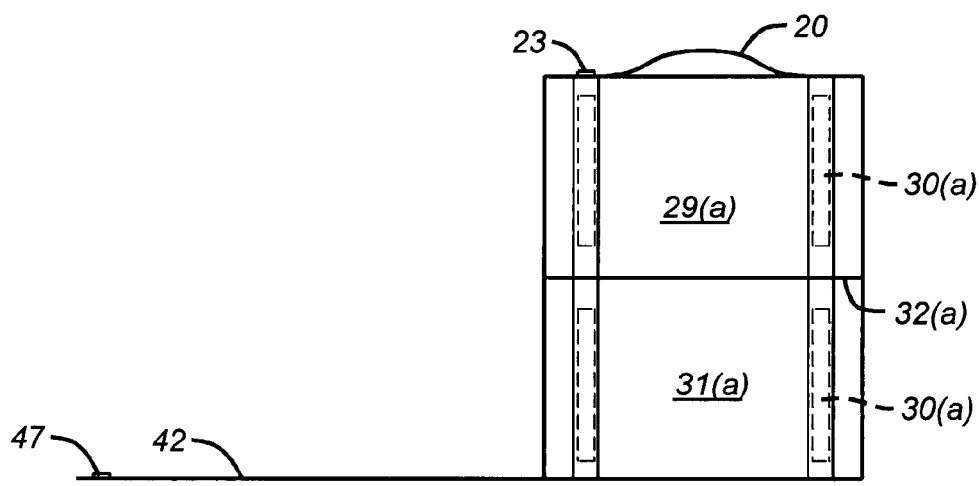
FIG. 3 is a side view of an embodiment of the second side wall.

The invention further comprises a handle 20 attached to the top wall and an adhesive strip 23 mounted on the top wall within 18 inches of the front edge as shown in FIGS. 1 and 3.

The invention further comprises an insulated bottom wall 24 comprising a back edge 25 attached to the bottom outer edge of the back wall such that the bottom wall is substantially perpendicular to the back wall and further comprising a front edge 26 opposite the bottom wall back edge. The bottom wall further comprises a horizontally extending rib channel 27 as shown in FIG. 1. In a preferred embodiment, the top and the bottom wall comprise two substantially parallel rib channels as shown in FIG. 1.

The invention further comprises a first insulated side wall 28(a) attached to the back wall, bottom wall and top wall such that the first side wall, is substantially perpendicular to the back wall, the bottom wall, and the top wall, when the first side wall is in an unfolded position as shown in FIGS. 1 and 3. The first side wall comprises an upper section 29(a) comprising a vertically extending rib channel 30(a) a lower section 31(a) comprising a vertically extending rib channel 30(a) and a horizontally extending joint 32(a) at the intersection of the upper and lower sections as shown in FIGS. 1 and 3. The first side wall further comprises a front section 33(a) as shown in FIG. 1.

Figure 2:
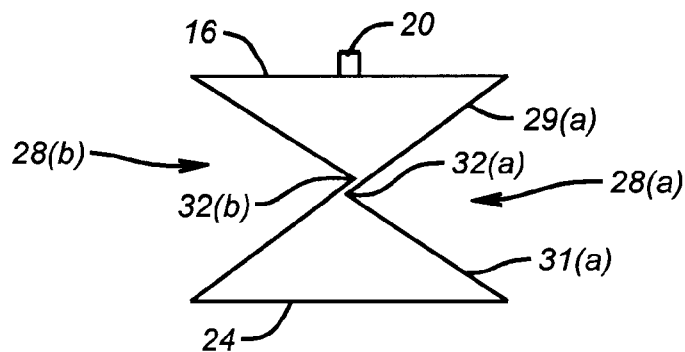
FIG. 2 is a front view of the present invention in a partially folded position.

The invention further comprises a second insulated side wall 28(b) attached to the back wall, bottom wall, and top wall, such that the second side wall is substantially perpendicular to the back wall, the bottom wall, and the top wall, when the second side wall is in an unfolded position as shown in FIG. 1. The second side wall comprises an upper section 29(b) comprising a vertically extending rib channel, 30(b) a lower section 31(b) comprising a vertically extending rib channel, and a horizontally extending joint 32(b) at the intersection of the upper section and lower section. The second side wall is attached to the top wall and bottom walls opposite from the first side wall as shown in FIG. 1. The second side wall further comprises a front section 33(b) as shown in FIG. 1. The side walls may be folded inwardly as shown in FIG. 2.

In a preferred embodiment, the joint comprises stitches. In another preferred embodiment, the upper section and lower section of each side wall comprise two substantially parallel rib channels.

In a preferred embodiment, the first side wall and second side wall are rectangular. In another preferred embodiment, the height of the side walls in an unfolded position is at least 1.0 inch.

The invention further comprises a rib 39 placed in each rib channel as shown in FIG. 1. In a preferred embodiment, the ribs are flexible. In another preferred embodiment, the ribs are inflexible. As shown in FIG. 3, each of the ribs is positioned such that the ribs in the upper section of the first and second side walls are spaced apart from the ribs in the lower sections of the first and second side walls, respectively. The spacing between the upper section ribs and the lower section ribs is centrally located on each side wall, as shown in FIG. 3. The central location of the spacing between the upper and lower ribs permits the side walls to be folded inward along the location of the rib spacing, as shown in FIG. 2. In a preferred embodiment shown in FIG. 3, each side wall comprises one pair of parallel rib channels in the upper portion and one pair of parallel rib channels in the lower portion. In a preferred embodiment shown in FIG. 3, each rib channel in each side wall upper portion is vertically aligned with a rib channel in the lower portion of the side wall.

The invention further comprises an insulated front wall 42 comprising a bottom border 43, a top border, 44, and two side borders 50 as shown in FIGS. 1 and 4. The bottom border is pivotably attached to the front edge of the bottom wall.

The invention further comprises a closure flap 46 attached to the top border of the front wall, and sized sufficiently large to extend over the adhesive strip. The invention also comprises an adhesive 47 affixed to the closure flap such that when the closure flap is placed on the adhesive strip, the adhesive material adheres to the adhesive strip as shown in FIGS. 1 and 4. In a preferred embodiment, the adhesive strip and the adhesive material comprise hook and loop fastening members.

In a preferred embodiment, the invention further comprises a side closure flap 45 attached to each border on the front wall, a side adhesive strip 51 extending vertically on the front section of each side wall and adhesive material 52 mounted on each of said side closure flaps such that when each said closure flap is placed on said adhesive strip, said adhesive material adheres to said adhesive strip as shown in FIGS. 1 and 4.

In a preferred embodiment, the side walls, top wall, bottom wall, and front wall define an internal volume of at least 4.0 cubic inches when the side walls are in an unfolded position. In another preferred embodiment, the internal volume of the pizza bag is at least 2.0 cubic feet when the side walls are in an unfolded position. In another preferred embodiment, the bag weighs less than 4.0 pounds.

The foregoing disclosure and description of the invention are illustrative and explanatory. Various changes in the size, shape, and materials, as well as in the details of the illustrative construction may be made without departing from the spirit of the invention.

What is claimed is:

1. A thermally insulated multistack pizza bag comprising:
   a. an insulated back wall comprising a top outer edge, a bottom outer edge, a first side outer edge, and a second side outer edge;
   b. an insulated top wall comprising a back edge attached to said top outer edge of said back wall such that said top wall is substantially perpendicular to said back wall and further comprising a front edge opposite said back edge;
   c. an adhesive strip mounted on said top wall within 18 inches of said front edge;
   d. an insulated bottom wall comprising a back edge attached to said bottom outer edge of said back wall such that said bottom wall is substantially perpendicular to said back wall and further comprising a front edge opposite said bottom wall back edge, said bottom wall further comprising a horizontally extending rib channel;
   e. a handle attached to said top wall;
   f. a first insulated side wall attached to said back wall, bottom wall and top wall, such that said first side wall is substantially perpendicular to said back wall, said bottom wall, and said top wall when said first side wall is in an unfolded position, said first side wall comprising an upper section comprising a vertically extending rib channel, a lower section comprising a vertically extending rib channel, said first side wall further comprising a front section;
   g. a second insulated side wall attached to said back wall, bottom wall and top wall, such that said second side wall is substantially perpendicular to said back wall, said bottom wall, and said top wall when said second side wall is in an unfolded position, said second side wall comprising an upper section comprising a vertically extending rib channel, a lower section comprising a vertically extending rib channel, said second side wall being attached to said top and bottom walls opposite from said first side wall, said second side wall further comprising a front section;
   h. a rib placed in each rib channel, each of said ribs being positioned such that the ribs in the upper sections of the first and second side walls are spaced apart from the ribs in the lower sections of the first and second side walls, respectively, and wherein the spacing between the upper section ribs and the lower section ribs is centrally located on each side wall;
   i. an insulated front wall comprising a bottom border, a top border and two side borders said bottom border being pivotably attached to the front edge of said bottom wall;
   j. a closure flap attached to the top border of said front wall and sized sufficiently large to extend over said adhesive strip; and
   k. an adhesive material affixed to said closure flap such that when said closure flap is placed on said adhesive strip, said adhesive material adheres to said adhesive strip.

2. The bag of claim 1, wherein said top wall and said bottom wall are rectangular.

3. The bag of claim 1, wherein said first side wall and said second side wall are rectangular.

4. The bag of claim 1, wherein said adhesive strip and said adhesive material comprise hook and loop fastening members.

5. The bag of claim 1, wherein said ribs are flexible.

6. The bag of claim 1, wherein each side wall comprises one pair of parallel rib channels in the upper portion and one pair of parallel rib channels in the lower portion.

7. The bag of claim 1, wherein the height of said side walls in an unfolded position is at least 1.0 inch.

8. The bag of claim 7, wherein said side walls, top wall, bottom wall, and front wall define an internal volume of at least 4.0 cubic inches when said side walls are in an unfolded position.

9. The bag of claim 1, wherein each upper section and lower section comprises two substantially parallel rib channels.

10. The bag of claim 1, wherein said bottom wall comprises two substantially parallel rib channels.

11. The bag of claim 1, wherein said top wall comprises a horizontally extending rib channel.

12. The bag of claim 6, wherein each rib channel in each side wall upper portion is vertically aligned with a rib channel in the lower portion of a side wall.

13. The bag of claim 1, further comprising:
 a. a side closure flap attached to each side border of said front wall;
 b. a side adhesive strip extending vertically on the front section of each side wall; and
 c. an adhesive material mounted on each of said side closure flaps such that when said side closure flap are placed on each of said side adhesive strips, said adhesive material adheres to said adhesive strips.

14. The bag of claim 8, wherein said bag weighs less than 4.0 pounds.

15. The bag of claim 7, wherein said side walls, top wall, bottom wall, and front wall define an internal volume of at least 3.0 cubic feet.

16. A thermally insulated multistack pizza bag comprising:
 a. an insulated back wall comprising a top outer edge, a bottom outer edge, a first side outer edge, and a second side outer edge;
 b. an insulated top wall comprising a back edge attached to said top outer edge of said back wall such that said top wall is substantially perpendicular to said back wall and further comprising a front edge opposite said back edge;
 c. an adhesive strip mounted on said top wall within 18 inches of said front edge;
 d. an insulated bottom wall comprising a back edge attached to said bottom outer edge of said back wall such that said bottom wall is substantially perpendicular to said back wall and further comprising a front edge opposite said bottom wall back edge, said bottom wall further comprising a horizontally extending rib channel;
 e. a handle attached to said top wall;
 f. a first insulated side wall attached to said back wall, bottom wall and top wall, such that said first side wall is substantially perpendicular to said back wall, said bottom wall, and said top wall when said first side wall is in an unfolded position, said first side wall comprising an upper section comprising a vertically extending rib channel, a lower section comprising a vertically extending rib channel, said first side wall further comprising a front section;
 g. a second insulated side wall attached to said back wall, bottom wall and top wall, such that said second side wall is substantially perpendicular to said back wall, said bottom wall, and said top wall when said second side wall is in an unfolded position, said second side wall comprising an upper section comprising a vertically extending rib channel, a lower section comprising a vertically extending rib channel, said second side wall being attached to said top and bottom walls opposite from said first side wall, said second side wall further comprising a front section;
 h. a rib placed in each rib channel, each of said ribs being positioned such that the ribs in the upper sections of the first and second side walls are spaced apart from the ribs in the lower sections of the first and second side walls, respectively, and wherein the spacing between the upper section ribs and the lower section ribs is centrally located on each side wall;
 i. an insulated front wall comprising a bottom border, a top border and two side borders said bottom border being pivotably attached to the front edge of said bottom wall;
 j. a closure flap attached to the top border of said front wall and sized sufficiently large to extend over said adhesive strip; and
 k. an adhesive material affixed to said closure flap such that when said closure flap is placed on said adhesive strip, said adhesive material adheres to said adhesive strip.

17. The bag of claim 16, wherein each side wall comprises one pair of parallel rib channels in the upper portion and one pair of parallel rib channels in the lower portion.

18. The bag of claim 16, wherein said top wall and said bottom wall each comprise two substantially parallel rib channels.

19. The bag of claim 16, wherein said top wall, bottom wall, and side walls are rectangular.

20. The bag of claim 16, further comprising:
 a. a side closure flap attached to each side border of said front wall;
 b. a side adhesive strip extending vertically on the front section of each side wall; and
 c. an adhesive material mounted on each of said side closure flaps such that when said side closure flap are placed on each of said side adhesive strips, said adhesive material adheres to said adhesive strips.

* * * * *